(12) United States Patent
Melde et al.

(10) Patent No.: US 9,169,749 B2
(45) Date of Patent: Oct. 27, 2015

(54) SEPARATING DEVICE

(71) Applicant: MANN+HUMMEL GMBH, Ludwigsburg (DE)

(72) Inventors: Markus Melde, Speyer (DE); Praveen Prahlad, Bangalore (IN)

(73) Assignee: MANN+HUMMEL GMBH, Ludwigsburg (DE)

( * ) Notice: Subject to any disclaimer, the term of this patent is extended or adjusted under 35 U.S.C. 154(b) by 233 days.

(21) Appl. No.: 13/887,863

(22) Filed: May 6, 2013

(65) Prior Publication Data
US 2013/0291501 A1 Nov. 7, 2013

(30) Foreign Application Priority Data

May 7, 2012 (DE) .......................... 10 2012 008 808

(51) Int. Cl.
*B01D 50/00* (2006.01)
*F01M 13/04* (2006.01)
*B01D 45/08* (2006.01)
*B01D 45/16* (2006.01)
*B01D 45/12* (2006.01)

(52) U.S. Cl.
CPC .............. *F01M 13/04* (2013.01); *B01D 45/08* (2013.01); *B01D 45/12* (2013.01); *B01D 45/16* (2013.01); *B01D 50/002* (2013.01); *F01M 2013/0433* (2013.01)

(58) Field of Classification Search
CPC ...... B01D 45/08; B01D 50/002; B01D 45/06; F01M 13/04; F01M 2013/0433
USPC ........................ 55/320, 385.3, 462, DIG. 19
See application file for complete search history.

(56) References Cited

U.S. PATENT DOCUMENTS 7,011,690 B2   3/2006  Altvater et al.
2011/0030629 A1  2/2011  Schleiden

FOREIGN PATENT DOCUMENTS

DE        10251947       5/2004
DE        102008017919   10/2009

*Primary Examiner* — Dung H Bui
(74) *Attorney, Agent, or Firm* — James Hasselbeck

(57) ABSTRACT

A separating device (1), in particular for a crankcase venting device of an internal combustion engine, includes an inlet (25) supplying a fluid containing particles to be separated, a baffle plate (22) separating the particles from the fluid, several nozzles (21) oriented toward the baffle plate (22), and a pivotable flap (15) that, as a function of its pivot position, fluidically connects a first number of nozzles (21) with the inlet (25) and fluidically separates from the inlet (25) a second number of nozzles (21).

11 Claims, 3 Drawing Sheets

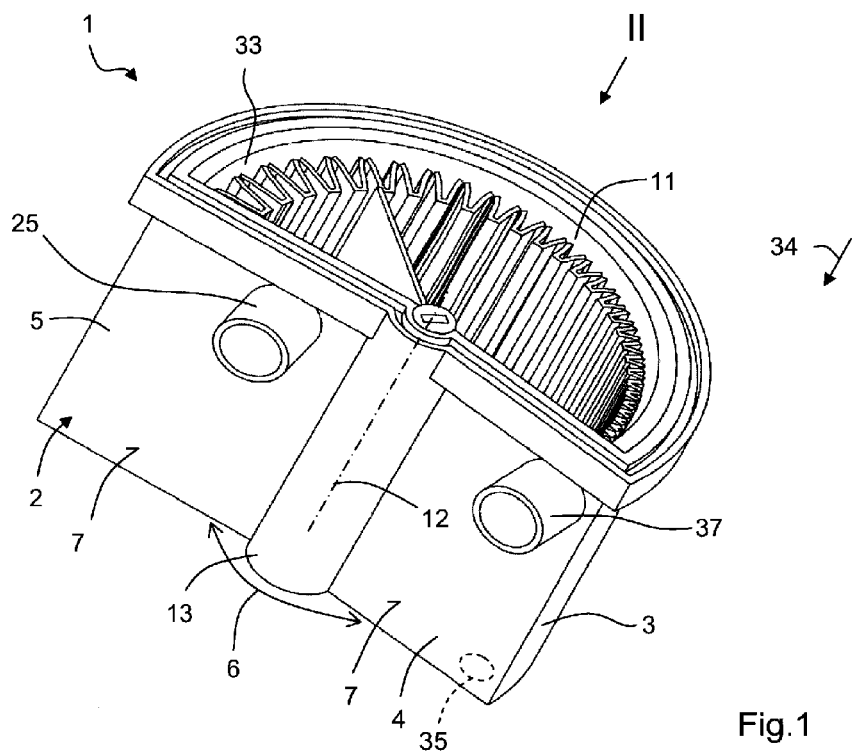
Fig.1
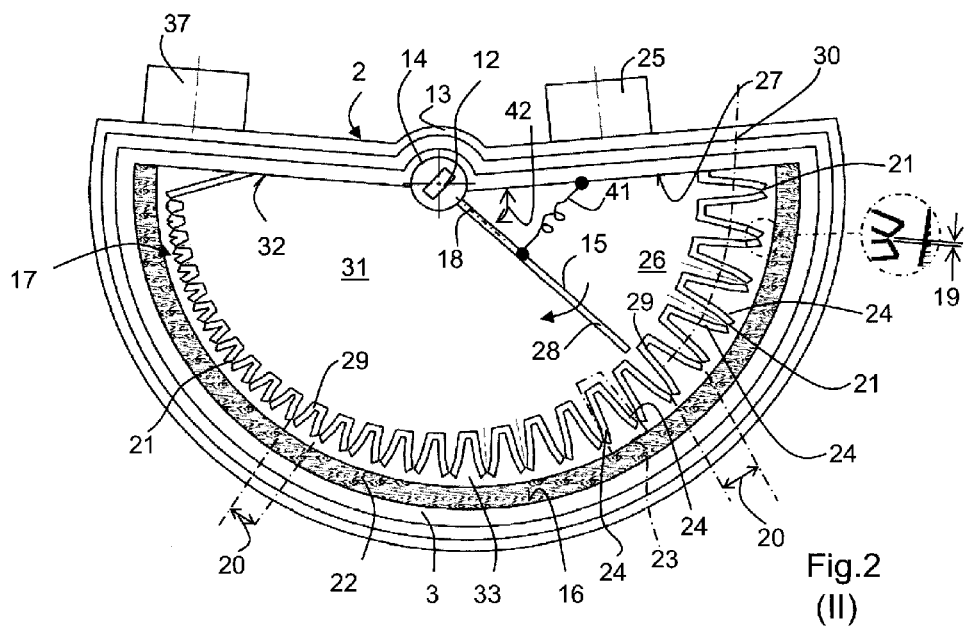
Fig.2 (II)

SEPARATING DEVICE

CROSS REFERENCE TO RELATED APPLICATIONS

This application claims the benefit under 35 USC 119 of foreign patent application DE 10 2012 008 808.6 filed in Germany on May 7, 2012, and which is hereby incorporated by reference in its entirety.

TECHNICAL FIELD

The present invention concerns a separating device, in particular for a crankcase venting device of an internal combustion engine.

BACKGROUND OF THE INVENTION

In operation of an internal combustion engine, blow-by gasses are generated in the crankcase. These blow-by gasses comprise an oil-air mixture. From this mixture the oil is to be separated and collected while the air is to be supplied to an intake manifold of the internal combustion engine.

For example, DE 10 2009 035 742 A1 describes an oil separating device for a crankcase of an internal combustion engine. The known separating device comprises a tubular inner part and an outer part surrounding it. The outer part has a baffle wall. The gas jets existing from gas passages in the interior part impinge on this baffle wall. A spherical valve element controls the volume flow that is impinging on the baffle wall. The oil that is separated at the baffle plate is collected while the air is supplied to the intake manifold of an internal combustion engine.

SUMMARY OF THE INVENTION

It is the object of the present invention to provide an improved separating device.

As a solution to this object, a separating device, in particular for a crankcase venting device of an internal combustion engine, is proposed which has an inlet, a baffle plate, several nozzles and a pivotable flap. The inlet is embodied for supplying a fluid containing particles to be separated. The baffle plate is embodied for separating the particles from the fluid. The several nozzles are directed onto the baffle plate. As a function of its pivot position, the flap fluidically connects a first number of nozzles with the inlet and fluidically separates a second number of nozzles from the inlet.

Since, by means of pivoting of the flap, the first and second numbers of nozzles are adjustable, a simple and reliable mechanism is provided.

Preferably, the pivot position of the flap varies as a function of the volume stream of the fluid through the inlet. Accordingly, a uniform separation, despite varying volume flow, can be achieved. Also, a pressure loss at the nozzles can be minimized in this way.

Preferably, for the first number M of nozzles, the second number N of nozzles, and the total number K of nozzles the following applies:

$$M+N=K$$

wherein $M>0$, $N>0$, $K>2$. This holds true for any pivot position of the flap.

The fluid can be a liquid or a gas. The fluid is in particular a gas mixture, for example, air. The particles can be liquid particles or solid particles. For example, the particles can be embodied as oil droplets.

According to a further embodiment, the separating device comprises a spring which loads the flap in such a way that it counteracts an increase of a volume flow of the fluid through the inlet. In this way, it is ensured that the fluid in the first number of nozzles is sufficiently accelerated in order to ensure a reliable separation at the baffle plate. The spring can be, for example, a spiral spring or a torsion spring. As an alternative to the spring, also an actuator, for example a hydraulic or electro-magnetic actuator, could be provided which, as a function of a control unit, adjusts the pivot position of the flap. The spring can also be formed by a monolithic embodiment of the flap with an axle wherein the axle is supported so as to be secured against rotation and a restoring force is generated by an elastic defor-ma-tion of the monolithic composite of flap and axle.

In one embodiment, the axis of rotation of the flap is horizontal and the opening direction of the flap is oriented such that the flap for opening must be lifted against the force of gravity. The flap is thus closed by its own weight and/or it experiences by its own weight a force in the direction of the inlet. By the weight of the flap, the restoring force can thus be adjusted against the incoming flow.

According to a further embodiment, the nozzles are distributed on a circular segment line and face in radial direction outwardly. In this context, "radial" refers to the center point of the circular segment line inasmuch as nothing to the contrary is indicated. In this context, "circular segment line" is to be understood as any partial circle, for example, a quarter circle or semi circle, but also a complete circle.

According to a further embodiment, the nozzles each have the same flow cross-section and/or a varying spacing relative to each other along the circular segment line. In this way, it can be achieved that, with increasing first number of nozzles and increasing spring force as well as increasing volume flow of the fluid, the exit speed of the fluid from the first number of nozzles remains constant. Accordingly, despite a changing volume flow of the fluid, a uniform separation at the baffle plate is achieved. The nozzles can have in particular a circular, polygonal, or in particular rectangular cross-section.

According to a further embodiment, the flap is pivotably supported about a center point of the circular segment line and extends with its free end up to a partition between the first number and the second number of nozzles in order to seal the first number and second number of nozzles relative to each other. In one embodiment, no complete sealing action is achieved but the free end has a minimal gap relative to the partition. Accordingly, a simple mechanism results in order to seal the first number and second number of nozzles from each other.

According to a further embodiment, between two nozzles each a partition is provided. Accordingly, several different pivot positions of the flap result in a simply way, each having correlated therewith a different number of first and second nozzles.

According to a further embodiment, the nozzles are arranged such that the spacing between two nozzles each decreases in the circumferential direction with increasing spacing from the inlet. In this way, it is achieved in a simple way that the exit speed of the fluid from the first nozzles, despite increasing volume flow and increasing spring force, remains constant so that a uniform separation at the baffle plate is achieved.

According to a further embodiment, the nozzles each have a constant cross-section. In this way, they can be produced simply, for example, by injection molding methods.

According to a further embodiment, the nozzles are oriented in a plane perpendicular to the force of gravity. An outlet for discharging the separated particles is oriented relative to the force of gravity in downward direction. Accordingly, the particles are deflected by approximately 90 degrees at the baffle plate so that a high degree of separation is achieved.

According to a further embodiment, the nozzles are oriented in a plane perpendicular to the force of gravity. An outlet for discharging the fluid from which the particles have been separated and/or the inlet is oriented in a plane perpendicular to the force of gravity. In this way, the fluid from which the particles have been separated is deflected at the baffle plate approximately perpendicularly so that a high degree of separation is achieved.

Further possible implementations of the invention comprise also combinations, not explicitly mentioned, of features disclosed above or in the following with regard to the embodiments or embodiments of the separating device. In this connection, a person of skill in the art will also add or modify individual aspects as improvements or supplements of the basic form of the invention.

Further embodiments of the invention are subject matter of the dependent claims as well as of the embodiment of the invention described in the following. In the following, the invention will be explained in more detail with the aid of embodiments with reference to the attached Figures.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 is as perspective view a separating device, consistent with the present invention;

FIG. 2 is a plan view of FIG. 1;

In the figures, the same reference numerals identify same or functionally the same elements inasmuch as nothing to the contrary is indicated.

Figure 3:
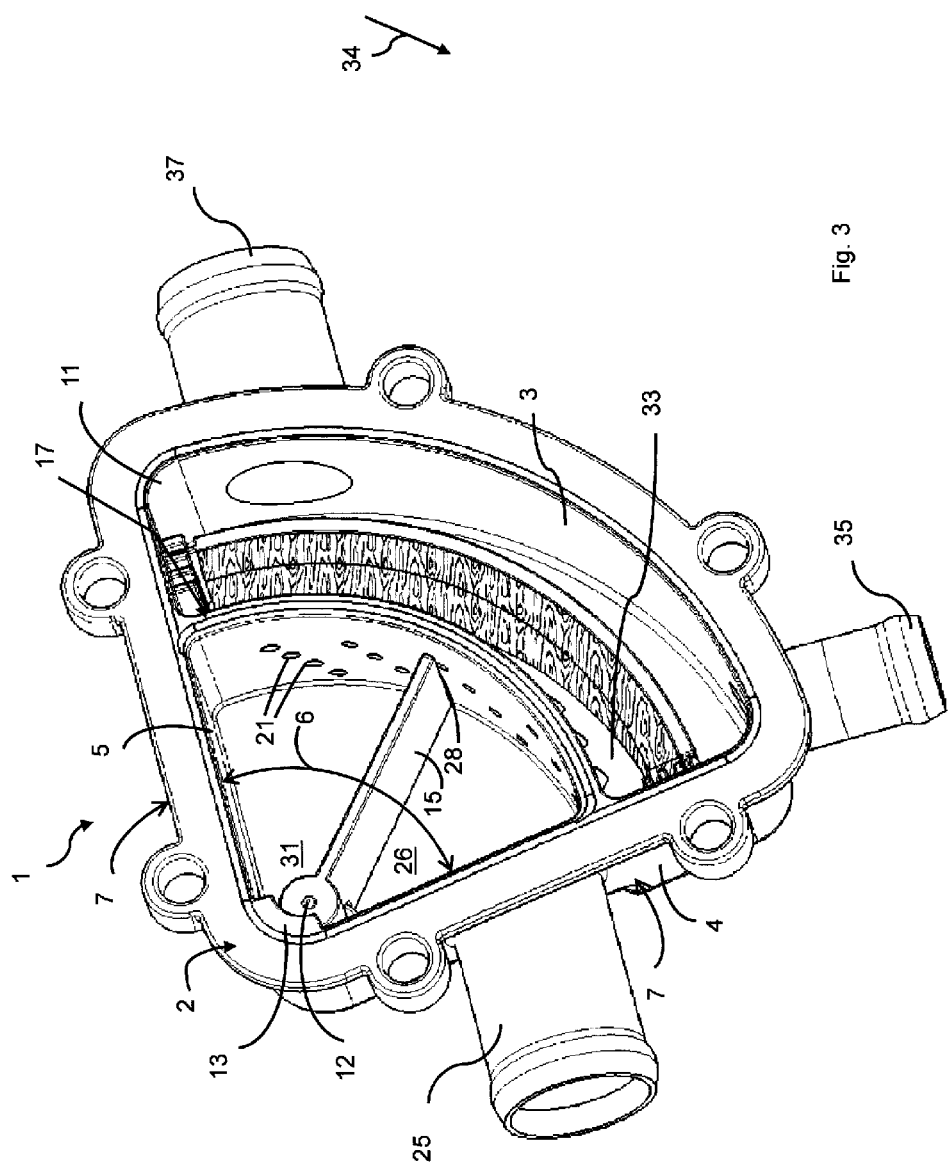
FIG. 3 is a perspective view another separating device, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a separating device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows in a perspective view one embodiment of a separating device 1. A cover element of the separating device 1 is removed in FIG. 1 in order to allow a view of the interior of the separating device 1. Also, in the following reference is being had to FIG. 2 which shows a view II of FIG. 1.

The separating device 1 comprises a housing 2 that is in plan view approximately half moon-shaped. The housing 2 has in plan view a circular segment-shaped sidewall 3 which is closed off at its open side by two sidewalls 4, 5. The sidewalls 4, 5 can meet each other at an angle 6 of between, for example, 170 degrees to 180 degrees. The angle 6 can also be more than 180 degrees, for example, 300 degrees, or less than 170 degrees, for example, only 100 degrees. In the case of the instant embodiment, the angle 6 is 175 degrees. The angle 6 is measured at the respective outer surfaces 7 of the sidewalls 4, 5 which are facing away from the interior 11 which is enclosed by the sidewalls 3, 4, 5. Accordingly, the sidewalls 4, 5 have a bend pointing toward the interior 11.

The sidewalls 4, 5 meet at a central axis 12 about which the circular segment-shaped sidewall 3 is curved. The sidewalls 4, 5 form in the area of the central axis 12 a receptacle 13. In the receptacle 13 a shaft 14 is supported so as to be rotatable about the central axis 12. On the shaft 14 a flap 15 is fixedly secured so that the flap 15 is pivotable about central axis 12. The central axis 12 is positioned in the main plane of extension 18 of the flap 15. The flap 15 extends from the shaft 14 into the interior 11. In the interior 11 and radially positioned between the flap 15 and an inner surface 16 of the sidewall 3, an insert 17 of approximately circular segment shape in plan view is arranged.

According to the embodiment, the insert 17 in plan view is approximately of a semi-circular shape. In this context, "radial" refers to the central axis 12. The insert can be embodied as a monolithic injection molded plastic part. The insert 17 comprises a plurality of nozzles 21. The nozzles 21 are oriented in radial direction outwardly onto a baffle wall 22 which is embodied in the form of a coating on the inner surface 16. The baffle wall 22 can have an open and/or porous structure, in particular a nonwoven or a foam. The structure is oil-resistant and temperature-resistant. For example, the structure can be made of plastic fibers or synthetic fibers.

The insert 17 has a plurality of elements 23. Such an element 23 in FIG. 2 is surrounded by a dash-dotted line. The element 23 has a substantially U-shaped cross-section wherein the free legs 24 of the U-shape are widening in radial direction outwardly, i.e., the spacing between two legs 24 of a U-shaped element 23 becomes larger outwardly in radial direction. Two legs 24 of neighboring elements 23 each form a nozzle 21. The nozzles 21 have along the central axis 12 a constant opening area 19, as illustrated in the enlarged illustration of FIG. 2. The insert 17 has preferably a constant cross-section along the central axis 12.

The flap 15 has a closed position, a plurality of different intermediate positions, and an open position. In FIGS. 1 and 2 the flap 15 is arranged in an exemplary fashion in one of the intermediate positions. In its closed position (not illustrated), the flap 15 closes off an inlet 25. The inlet 25 is formed in the sidewall 5 and is in fluidic communication with a first volume 26 when the flap 15 is in one of the intermediate positions. By means of the inlet 25 an oil-air mixture, in particular an oil mist, is supplied to the separating device 1 from a crankcase of an internal combustion engine.

The volume 26 is delimited by the flap 15 and a first number of elements 23 or nozzles 21 as well as an inner surface 27 of the sidewall 5. The free end 28 of the flap 15 is arranged so as to adjoin a partition in the form of a central section 29 between two legs 24 of an element 23. In this way, the first volume 26 is sealed relative to a second volume 31 of the separating device 1 even when the existing gap enables a negligible fluid exchange between the volumes 26, 31. The second volume 31 is delimited by a second number of elements 23 or nozzles 21, the flap 15, as well as an inner surface 32 of the sidewall 4.

The elements 23, or the nozzles 21, are distributed along a circular segment line 30 which extends substantially parallel to the sidewall 3. The central axis 12 extends through the center point of the circular segment line 30. Also, spacings 20 between two nozzles 21 each become smaller in the opening direction of the flap 15. The opening direction is indicated with a corresponding arrow in FIG. 2.

Relative to the force of gravity 34, a third volume 33, defined between the insert 17 and the baffle wall 22, is in fluidic communication in downward direction with a first outlet 35 in a bottom 36 of the housing 2. The bottom 36 delimits the interior 11 together with the cover, not illustrated, and the sidewalls 3, 4, 5 completely.

Moreover, in the sidewall 4 a second outlet 37 is arranged which is also in fluidic communication with the third volume 33. While the first outlet 35 is oriented in the direction of the force of gravity 34, the inlet 25 as well as the second outlet 37 are each oriented in a plane perpendicular to the force of gravity 34. In this context, "oriented" relates to the central axis of the outlets 35, 37 or the inlet 25.

Moreover, the separating device 1 has a spring 41 which loads the flap 15 into the closing direction. The spring 41, as indicated, can be a spiral tension spring. Alternatively, the spring 41 can be embodied as a torsion spring which is integrated in particular into the shaft 14.

In the pivot position of the flap 15 which is illustrated in FIG. 2, the oil-air mixture is guided by means of the first number of nozzles 21 onto the baffle wall 22 whereupon the oil is separated in downward direction through the first outlet 35 and the air is supplied via the second outlet 37 to an intake manifold of the internal combustion engine. When, for example, the power input of the internal combustion engine is increased, the volume flow from the crankcase (not illustrated) increases so that the flap 15 is opened farther against the action of the spring 41, i.e., the opening angle 42 is enlarged. Since the spring force of the spring 41 increases with increasing opening action of the flap 15, the pressure in the first volume 26 would increase in fact. However, since the spacing 20 between the nozzles 21 is reduced with increasing opening action of the flap 15, relatively more nozzles 21 will communicate fluidically with the first volume 26 than in the case for the smaller opening angle 42. Accordingly, the pressure in the first volume 26 effectively does not rise, so that despite increasing volume flow a constant outlet speed of the fluid out of the nozzles 21 can be observed. Accordingly, a uniform degree of separation with minimal pressure loss is ensured.

FIG. 3 shows in a perspective view a second embodiment of a separating device 1. The cover element of the separating device 1 is also removed in FIG. 3 and in FIG. 4 in order to allow a view of the interior of the separating device 1. Also, in the following reference is being had to FIG. 4 which illustrates a view along the central axis into the interior of the separating device.

The separating device 1 comprises a housing 2 which in a plan view is approxi-mately of a half-moon shape. In plan view, the housing 2 has a sidewall 3 of a circular segment shape which at its open side is closed off by two sidewalls 4, 5. The sidewalls 4, 5 can meet each other at an angle 6 of between, for example, 30 degrees and 180 degrees. The angle 6 can also be more than 180 degrees, for example 300 degrees, or less than 170 degrees, for example only 100 degrees. In the case of the present embodiment, the angle 6 is, for example, between 45 de-grees and 90 degrees, preferably between 80 degrees and 90 degrees. The angle 6 is measured at the respective outer surfaces 7 of the sidewalls 4, 5 which are facing away from an interior 11 which is enclosed by the sidewalls 3, 4, 5. Accordingly, the sidewalls 4, 5 enclose the interior 11 at a slightly acute angle.

The sidewalls 4, 5 meet in the area of a central axis 12 about which the circular segment-shaped sidewall 3 is curved. In the area of the central axis 12, adjoining the sidewalls 4, 5, a receptacle 13 is formed. In the receptacle 13 a shaft 14 is provided that is rotatably supported about central axis 12. On the shaft 14 a flap 15 is fixedly mounted so that the flap 15 is pivotable about the central axis 12. The central axis 12 is positioned in the main plane of extension 18 of the flap 15. The flap 15 extends from the shaft 14 into the interior 11. In the interior 11 and radially positioned between the flap 15 and an inner surface 16 of the sidewall 3, an insert 17 is arranged that in plan view is approximately of a circular segment shape. According to the embodiment, the insert 17 in plan view is approximately of a quarter circle shape. In this context, "radial" refers to the central axis 12. The insert can be produced as a monolithic injection molded plastic part. The insert 17 comprises a plurality of nozzles 21. The nozzles 21 are radially outwardly oriented onto an baffle wall 22 which is in the form of a coating on the inner surface 16. The baffle wall 22 can be an open and/or porous structure, in particular can comprise a nonwoven or a foam. The structure is oil-resistant and temperature-resistance. For example, the structure can be formed of synthetic fibers. The insert 17 in the embodiment according to FIG. 3 is embodied as a substantially closed wall wherein the nozzles 21 are formed as bores or holes. They can be embodied with circular, rectangular, triangular or polygonal with more than 4 corners. The nozzles 21 can be distributed across the insert, for example, irregularly, preferably however regularly, along the angle 6 and either each radially and as a whole in a fan shape, as illustrated in FIG. 3, or instead aligned parallel to each other, as illustrated in the variant of FIG. 4.

Figure 4:
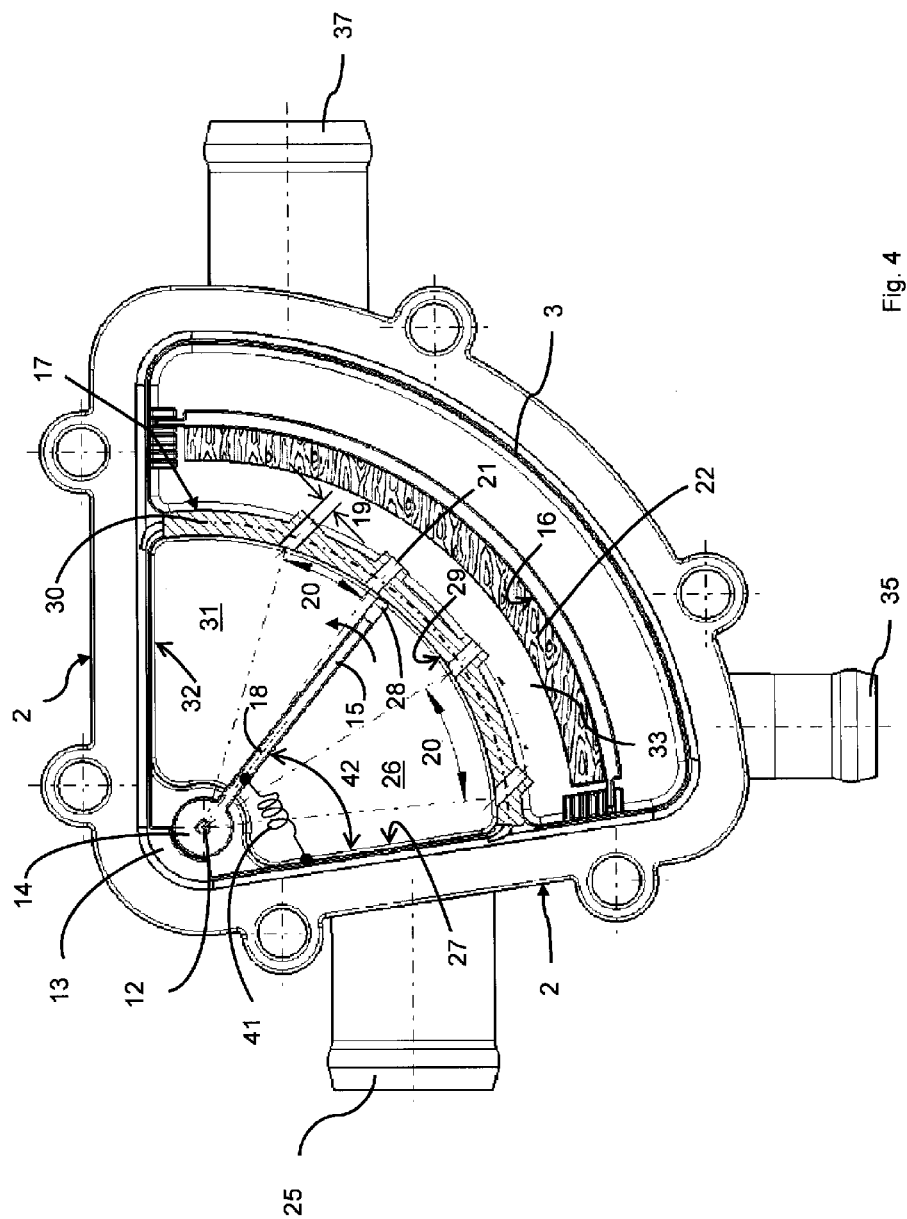
FIG. 4 is a plan view of the separating device in FIG. 3.

As also depicted in the embodiments shown in FIG. 3 and FIG. 4, the flap 15 has a closed position, a plurality of different intermediate positions, and an open position. In FIGS. 3 and 4, the flap 15 is arranged in an exemplary fashion in one of the intermediate positions. In its closed position (not illustrated), the flap 15 closes off an inlet 25. The inlet 25 is formed in the sidewall 4 and is in fluidic communication with a first volume 26 when the flap 15 is in one of its intermediate positions. By means of the inlet 25, the separating device 1 can be supplied with an oil-air mixture, in particular an oil mist, from a crankcase of an internal combustion engine.

The volume 26 is delimited by the flap 15 and a first number of elements 23 or nozzles 21 as well as an inner surface 27 of the sidewall 4. The free end 28 of the flap 15 is arranged adjoining a partition in the form of a center section 29 between two legs 24 of an element 23. In this way, the first volume 26 is sealed relative to a second volume 31 of the separating device 1 even though the existing gap allows for a negligible fluid exchange between the volumes 26, 31. The second volume 31 is delimited by a second number of elements 23 or nozzles 21, the flap 15 as well as an inner surface 32 of the sidewall 4.

The nozzles 21 are distributed along a circular segment line 30 which extends substantially parallel to the sidewall 3. The central axis 12 extends preferably through the center point of the circular segment line 30 or is adjacent thereto. Also, preferably the spacings 20 between two nozzles 21 each become smaller in the opening direction of the flap 15. The opening direction is indicated with a corresponding arrow in FIG. 4. Alternatively, the spacing in the circumferential direction can be designed to be constant.

A third volume 33 which is defined between the insert 17 and the baffle wall 22 is in fluidic communication in downward direction, relative to the force of gravity 34, with the first outlet 35 in a bottom 36 of the housing 2. The bottom 36 delimits together with the cover, not illustrated, and the sidewalls 3, 4, 5 the interior 11 completely.

Also, in the sidewall 3 a second outlet 37 is arranged which is also in fluidic communication with the third volume 33. While the first outlet 35 is oriented in the direction of the force of gravity 34, the inlet 25 as well as the second outlet 37 are oriented each in a plane perpendicular to the force of gravity 34. In this context, "oriented" refers to a central axis of the outlets 35, 37 or the inlet 25, respectively. When an arrangement is to be provided in which the bottom 36 is perpendicular to the force of gravity, the second outlet 37 is arranged in the bottom. The same holds true accordingly for an arrangement in which one of the sidewalls 3, 4 would be oriented perpendicular to the force of gravity; in this case, the second outlet would be arranged in them, respectively.

Moreover, the separating device 1 has a spring 41 which loads the flap 15 in the closed position. The spring 41, as illustrated, can be embodied as a spiral tension spring. Alternatively, the spring 41 can be embodied as a torsion spring which is integrated in particular into the shaft 14.

In the pivot position of the flap 15 as illustrated in FIG. 4, the oil-air mixture is deflected by means of the first number of nozzles 21 onto the baffle wall 22 where-upon the oil is separated in downward direction via the first outlet 35 and the air is supplied by the second outlet 37 to an intake manifold of the internal combustion engine. When now, for example, the power input of the internal combustion engine increases, the volume flow from the crankcase (not illustrated) thus increases so that the flap 15 is opened farther against the action of the spring 41, i.e., its opening angle 42 increases. Since the spring force of the spring 41 with increasing opening of the flap 15 increases, actually the pressure in the first volume 26 would rise. However, since the spacing 20 between the nozzles 21 with increasing opening of the flap 15 is reduced, relatively more nozzles 21 will come into fluidic commu-ni-cation with the first volume 26 than in case of smaller opening angles 42. Accordingly, the pressure in the first volume 26 effectively does not rise so that despite increasing volume flow a uniform exit speed of the fluid from the nozzles 21 is observed. As a result, a uniform degree of separation with minimal pressure loss is ensured.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A separating device for a crankcase venting device of an internal combustion engine, comprising: an inlet supplying a fluid containing particles to be separated; a baffle plate operable to separate the particles from the fluid; a plurality of nozzles oriented toward the baffle plate; and a pivotable flap operable by adjustment of a pivot position of the pivotable flap to fluidically connect a first subset of said plurality of nozzles with the inlet and fluidically separate from the inlet a different second subset of nozzles; wherein the plurality of nozzles are distributed on a circular segment line and are pointing in a radial direction outwardly; and wherein the flap is pivotably supported about a center point of the circular segment line, a free end of the flap extending up to a partition between the first and the second number of nozzles in order to seal the first and second numbers of nozzles from each other.

2. The separating device according to claim 1, comprising a spring applying a load to the flap such that the flap counteracts an enlargement of a volume flow of the fluid through the inlet.

3. The separating device according to claim 1, wherein the plurality of nozzles each have a constant cross-section.

4. The separating device according to claim 1, wherein the plurality of nozzles are oriented in a plane perpendicular to force of gravity and an outlet discharging the separated particles is facing downwardly relative to the force of gravity.

5. The separating device according to claim 1, having at least one of: the plurality of nozzles are oriented in a plane perpendicular to force of gravity and an outlet discharging the fluid from which the particles have been separated and/or the inlet is oriented in a plane perpendicular to the force of gravity.

6. The separating device according to claim 1, wherein the plurality of nozzles each have at least one of: same flow cross-section and varying distance between adjacent nozzles along the circular segment line.

7. The separating device according to claim 6, wherein the plurality of nozzles are arranged such that the spacing between adjacent two nozzles decreases with increasing spacing from the inlet.

8. The separating device according to claim 1, wherein between adjacent two nozzles of the plurality of nozzles a partition is provided.

9. The separating device according to claim 2, wherein the plurality of nozzles are distributed on a circular segment line and are pointing in radial direction outwardly; wherein the plurality of nozzles each have at least one of: the same flow cross-section and a varying distance between adjacent nozzles along the circular segment line; wherein between adjacent two nozzles of the plurality of nozzles a partition is provided; wherein the plurality of nozzles are arranged such that distance between adjacent two nozzles decreases with increasing distance of the adjacent two nozzles from the inlet.

10. The separating device according to claim 9, wherein the plurality of nozzles are oriented in a plane perpendicular to force of gravity and an outlet discharging the separated particles is facing downwardly relative to the force of gravity.

11. The separating device according to claim 9, wherein the plurality of nozzles are oriented in a plane perpendicular to force of gravity and an outlet discharging the fluid from which the particles have been separated and/or the inlet is oriented in a plane perpendicular to the force of gravity.

\* \* \* \* \*